(12) United States Patent
de la Garza de la Fuente

(10) Patent No.: US 10,159,352 B2
(45) Date of Patent: Dec. 25, 2018

(54) ADJUSTABLE AND DISMOUNTABLE ARM REST

(71) Applicant: JoséÁngel de la Garza de la Fuente, Saltillo (MX)

(72) Inventor: JoséÁngel de la Garza de la Fuente, Saltillo (MX)

(*) Notice: Subject to any disclaimer, the term of this patent is extended or adjusted under 35 U.S.C. 154(b) by 0 days.

(21) Appl. No.: 15/511,845

(22) PCT Filed: Sep. 22, 2014

(86) PCT No.: PCT/MX2014/000146
§ 371 (c)(1),
(2) Date: Mar. 16, 2017

(87) PCT Pub. No.: WO2016/043574
PCT Pub. Date: Mar. 24, 2016

(65) Prior Publication Data
US 2017/0295938 A1    Oct. 19, 2017

(30) Foreign Application Priority Data

Sep. 19, 2014  (MX) ............... MX/u/2014/000459 U

(51) Int. Cl.
*A47C 7/70*    (2006.01)
*A47C 7/54*    (2006.01)
(Continued)

(52) U.S. Cl.
CPC ............... *A47C 7/70* (2013.01); *A47C 7/546* (2013.01); *A47C 16/00* (2013.01); *F16M 11/22* (2013.01); *F16M 13/04* (2013.01)

(58) Field of Classification Search
CPC ........... A47C 7/70; A47C 7/543; A47C 16/00; A47C 7/546; F16M 11/02; F16M 13/04;
(Continued)

(56) References Cited

U.S. PATENT DOCUMENTS 1,863,309 A * 6/1932 Kitts ...................... G03B 21/20
                                                       248/663
2,172,178 A * 9/1939 Rosenberg ............. A47C 16/00
                                                       135/69

(Continued)

*Primary Examiner* — Theodore V Adamos
(74) *Attorney, Agent, or Firm* — William C. Yarbrough, III; Mario A. Varela; Kearney, McWilliams & Davis, PLLC

(57) ABSTRACT

An adjustable, dismountable arm-rest designed to maintain the precision and stability of an arm while holding objects such as binoculars and photographic and video cameras. The device itself consists of two horizontal rails and two vertical posts that create a frame wherein the horizontal rails exhibits holes running the length of each rail that are made to accept the vertical posts at a point, equally numbered, selected and desired by the user on both top and bottom horizontal rails where the upper distance between the vertical posts is greater than the lower distance. The device itself is secured by running a belt thorough centrally deposed slots in the horizontal rails which are designed to be pulled taut to secure the device from disassembly. The lower horizontal rail is made to communicate with the user's thigh and the upper horizontal rail is designed to receive the user's arm.

17 Claims, 3 Drawing Sheets

(51) Int. Cl.
  *A47C 16/00* (2006.01)
  *F16M 11/22* (2006.01)
  *F16M 13/04* (2006.01)

(58) Field of Classification Search
  CPC ... F16M 2200/06; F16M 11/22; G03B 17/561
  USPC .......... 211/13.1, 41.13, 189, 195, 85.24, 74;
    248/176.1, 187.1, 177.1, 178.1, 127, 371,
    248/393, 394, 395, 398, 118, 118.1,
    248/118.3, 118.5, 121, 151, 165, 172,
    248/188.8, 220.42; 294/139, 143;
    396/419, 420, 422, 423, 428; 348/373,
    348/376; 352/243; 89/37.04, 37.03,
    89/37.09, 37.13, 40.01
  See application file for complete search history.

(56) References Cited

U.S. PATENT DOCUMENTS

| | | | | |
|---|---|---|---|---|
| 2,642,117 A * | 6/1953 | Glauber | ................. | A47K 17/02 248/118 |
| 3,369,787 A * | 2/1968 | Dasta | ................. | A61B 6/14 248/118 |
| 3,586,278 A * | 6/1971 | Simons | ................. | F16M 11/12 248/121 |
| 4,005,840 A * | 2/1977 | Ratkovich | ................. | A47C 16/00 211/202 |
| 4,128,317 A * | 12/1978 | LeCover | ................. | A61B 3/00 248/118 |
| 4,272,177 A * | 6/1981 | Ottenheimer | ................. | F16M 11/08 396/423 |
| 4,476,885 A * | 10/1984 | Stein | ................. | A61H 3/02 135/69 |
| 4,514,067 A * | 4/1985 | Gallegos | ................. | F16M 13/04 224/908 |
| 4,738,383 A * | 4/1988 | Dearborn | ................. | A45F 4/02 224/153 |
| 4,782,917 A * | 11/1988 | Schulz | ................. | E04G 1/34 182/131 |
| 4,896,804 A * | 1/1990 | Dearborn | ................. | A45F 3/08 224/153 |
| 5,173,563 A * | 12/1992 | Gray | ................. | F41A 23/02 42/94 |
| 5,303,890 A * | 4/1994 | Carruth | ................. | A47C 20/026 248/118 |
| 5,560,573 A * | 10/1996 | Colver | ................. | F16M 11/046 248/118 |
| 5,613,664 A * | 3/1997 | Svalbe | ................. | E04H 17/003 256/19 |
| 5,890,025 A * | 3/1999 | Hart | ................. | F16M 13/04 396/420 |
| 5,908,181 A * | 6/1999 | Valles-Navarro | .... | F16M 11/045 248/177.1 |
| 6,601,999 B1 * | 8/2003 | McTeer | ................. | F16M 13/04 396/420 |
| 7,857,268 B2 * | 12/2010 | Chiu | ................. | B60R 11/04 248/149 |
| 9,500,316 B2 * | 11/2016 | Terpening | ................. | A45F 5/00 |
| 9,689,410 B2 * | 6/2017 | Ostervig | ................. | F16B 1/00 |
| 2003/0205543 A1 * | 11/2003 | Kao | ................. | A47B 47/0016 211/74 |
| 2006/0147188 A1 * | 7/2006 | Weng | ................. | F16M 11/046 396/5 |
| 2009/0050756 A1 * | 2/2009 | Newkirk | ................. | A61G 7/0503 248/176.1 |
| 2009/0321593 A1 * | 12/2009 | Foddis | ................. | F16M 11/16 248/187.1 |
| 2010/0320338 A1 * | 12/2010 | Chen | ................. | A47F 7/0028 248/121 |
| 2011/0129210 A1 * | 6/2011 | McGucken | ................. | F16M 13/02 396/422 |
| 2012/0263445 A1 * | 10/2012 | Beasley | ................. | G03B 15/006 396/12 |
| 2012/0285909 A1 * | 11/2012 | Parker | ................. | F16M 11/041 211/49.1 |
| 2015/0103245 A1 * | 4/2015 | Harwell | ................. | G09F 3/204 348/376 |
| 2016/0331126 A1 * | 11/2016 | Mills | ................. | B60N 2/806 |

\* cited by examiner

ADJUSTABLE AND DISMOUNTABLE ARM REST

TECHNICAL FIELD

This patent application refers generally to an arm-rest and in particular to an adjustable and dismountable arm-rest.

OBJECT OF THE INVENTION

This patent application is intended to provide an adjustable and dismountable arm-rest to support arms for long periods of time, to permit stability when holding items that require precision such as binoculars, photographic cameras, or other equipment and/or accessories, that have a determined weight and would cause fatigue while monitoring in inhospitable places to capture the behaviour of a particular event, e.g. opening of a flower, behaviour of animals, among others.

The arm-rest is manufactured is such a way that when the user is seated he has this arm-rest which is adjustable in length, which makes it possible to adjust to different user heights, providing them with a firm support for the best stability and reduce tiredness that would be caused by holding a certain object such as a camera, for long periods of time.

BACKGROUND

When you are in a field or forest and have the need to capture natural contexts and it is not necessary to alter the location of the objects, and to wait the necessary time for the natural contexts to happen in order to capture them. Therefore, the number of objects taken should be reduced, be of light weight and small size for loading.

At all times the user is prepared to capture the images, which normally requires holding photographic or video cameras, binoculars for long periods of time, and would cause tiredness and instability in their arms. It is for this reason that this patent application of arm-rest is used as it is light, dismountable and adjustable to the height of the user as it is possible to rest his arms while on high alert to capture the scene at the necessary precise moment. This is possible without altering the context with large objects, such as those that are commercially available, which consists of chairs or benches in order to articulate the arm-rest.

DETAILED DESCRIPTION OF THE INVENTION

Figure 1:
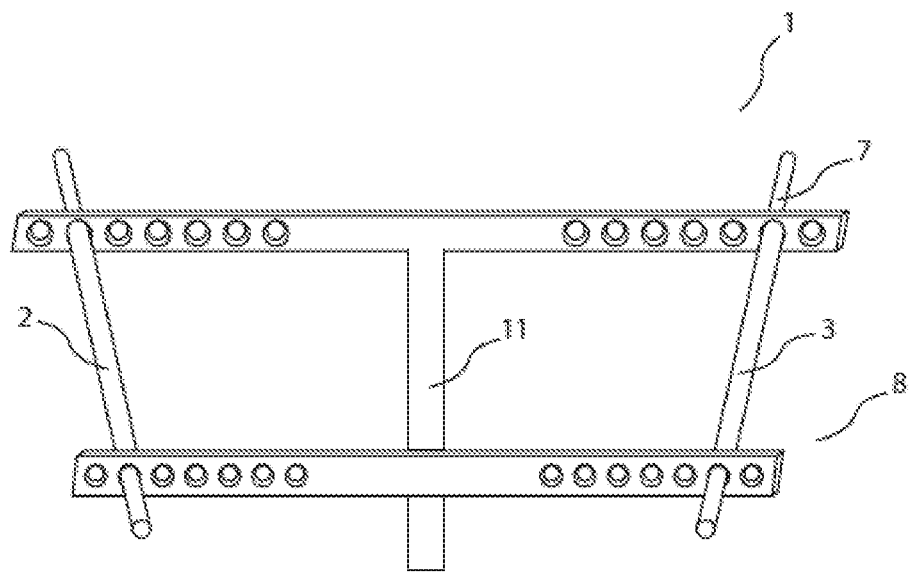
FIG. 1. Schematic representation of the front view of the portable arm-rest, which is the object of this application FIG. 2. Schematic representation of the top view of the portable arm-rest, which is the object of this application.
Figure 2:
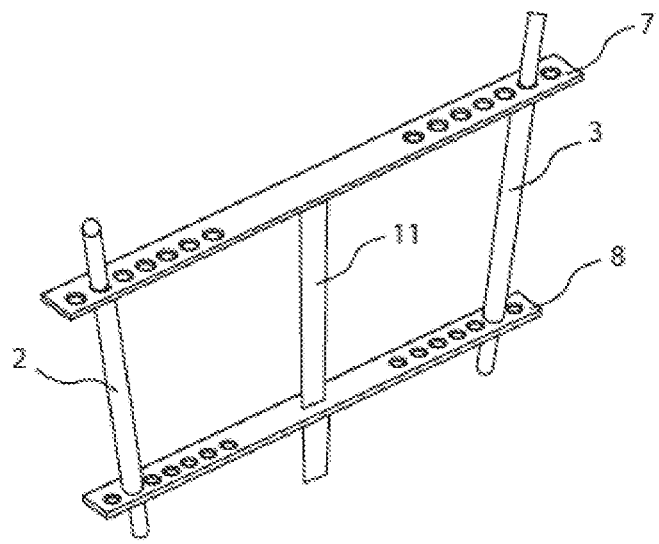

The arm-rest, which is the motive for this patent application, consists of an adjustable and dismountable arm-rest that is placed on the thighs of the user, and the top provides support for the arms, and its front view is represented in FIG. 1

The arm-rest (1) includes: a first (2) and second (3) vertical posts of the same length. The length of construction is variable between 35 cm and no more than 45 cm, as this is the average distance with the arms extended to the front with the legs flexed, when a person is sitting.

The vertical posts are separated by a first and second distance, the first distance is larger than the second, so that the distance between them decreases in the lower part.

Figure 7:
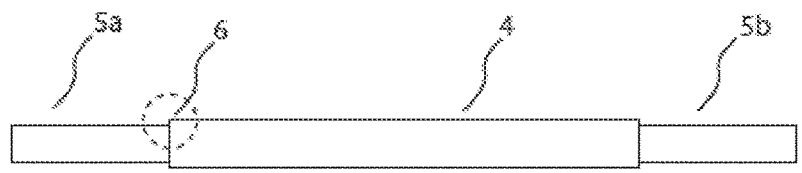
FIG. 7. Schematic representation of the longitudinal cross-section of the vertical post.

In FIG. 7, is shown the for longitudinal cross-section of the vertical post (2, 3) in which is shown in the middle part (4) a diameter, and at its extremities (5a and 5b) a second smaller diameter, forming a step (6) at each of the extremities. The second diameters located at the extremities are equal in size.

Preferably the first diameter in the middle of it is at least 3 mm larger than the second diameters contained at its extremities In particular, the first diameter is 2.5 cm wide and 22 cm long; and the higher and lower extremities of the vertical posts presents a length preferably from 8 cm to 11 cm.

Figure 3:
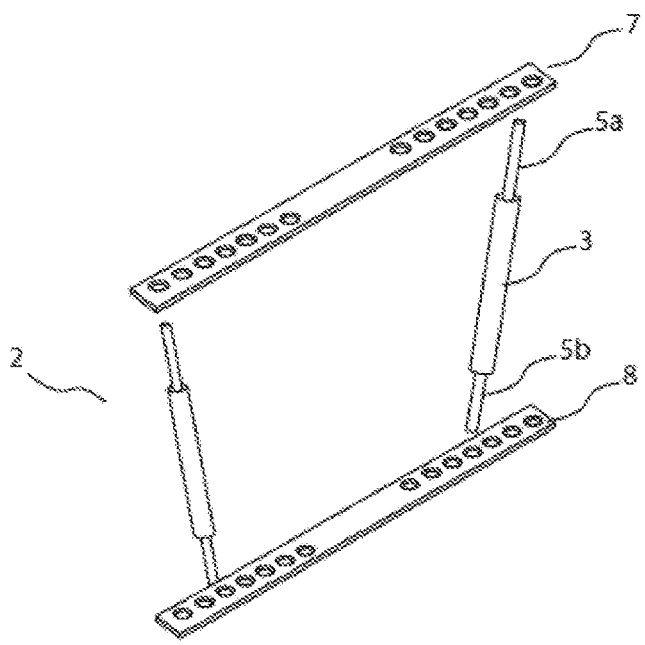
FIG. 3. Schematic representation of the exploded view of the portable arm-rest, which is the object of this application.

In FIG. 3, is shown a schematic representation of the exploded view of the arm-rest for which is distinguishable: as the higher extremities (5a) of the both vertical posts are temporarily fixed to the first horizontal rail (7), and the lowest ext remit (5b) of both vertical posts are temporarily fixed to the second horizontal rail (8), with less distance between them.

Figure 4:
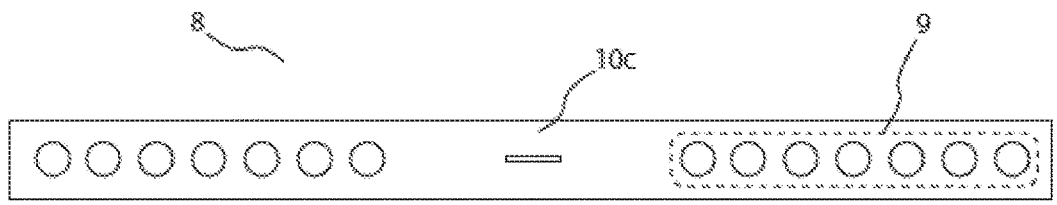
FIG. 4. Schematic representation of the top view of the second horizontal rail.
Figure 5:
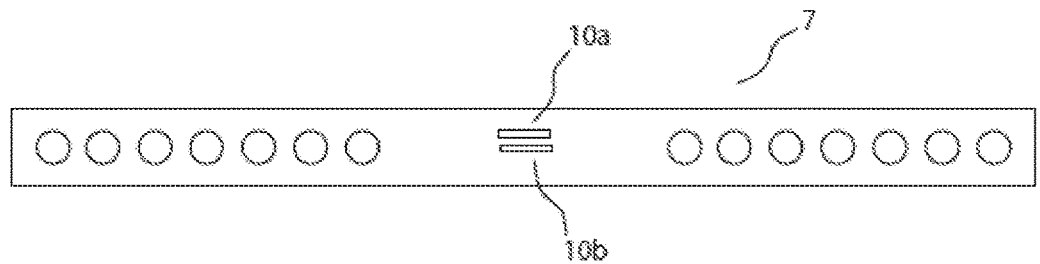
FIG. 5. Schematic representation of the top view of the first horizontal rail.
Figure 6:
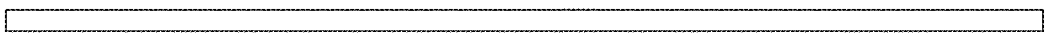
FIG. 6. Schematic representation of the longitudinal cross-section of the horizontal rail.

In particular, the first and second horizontal rails (7 and 8), represented in FIGS. 4, 5 and 6, consist of a prismatic rectangular shape whose wider section placed perpendicular to the vertical posts to provide a larger support space for the arms and thighs of the user whilst he is waiting. At the ends of each of the first and second horizontal rails there are a set of holes (9) equally spaced, that pass through the whole of its thickness and equal in number and size, where each hole of the set of perforations (9) are made with an inclination of 10° towards the centre or midpoint of the horizontal rail and the diameter of each hole coincides with the corresponding second hole diameter (5a and 5b) of each of the vertical posts (3 and 4), so that the top of each vertical post passes through the holes at each end of the horizontal rails, using the same perforation number, (for example: put it into perforation 1 of each extremity) and slide it on to the first horizontal rail (7) to highest ends of the first (3) and second (4) vertical posts that presents a second diameter until it reaches the steps (6), formed at the end of each extremity by the change of diameters in its middle part; and each of the lower extremities of the vertical posts (5b) are introduced at each extremity of the second horizontal rail (8) to a determined perforation number which coincides with the orifice selected on the first higher horizontal rail (7), so that the second horizontal rail slides on to the lowest extremities of the first and second vertical posts (3 and 4) that have a second diameter, until it reaches the steps (6) that is formed by the change of diameters in the middle part; each step (6) acts as a stop or brake for each horizontal rail that are temporarily assembled at the top and bottom ends of the vertical posts.

This request is intended as a temporary assembly, one that allows you to assemble and dismount the different elements of the arm-rest for a period of time, according to the needs and preferences of the user.

The first horizontal rail (7), represented with a top view in FIG. 5, presents at its centre two small slots (10a and 10b)

parallel to its length, and the second horizontal rail (8) shown in FIG. 4, which presents at its centre one slot (10*c*), all of equal length. Through the slot 10*c* is put the belt (11) with a device at the opposite extremity to avoid it slipping out, and it slides between the first and second slots, so that the free end can attach itself firmly. Preferably the belt (11) has a type of retention such as Velcro®, hooks, buttons, just to mention a few examples, that permits the temporary retention between the horizontal rails when the support is assembled.

It is important to note that the sets of perforations located at the extremities of each horizontal rail, is composed of preferably 7 holes in each set.

The first horizontal rail has a length of at least 40 cm and a maximum of 100 cm and the second horizontal rail should have a minimum length of 30 cm and a maximum of 90 cm. Despite the difference in length between the first and second horizontal rails, that varies between 10% and 20% of the length between them, the perforations coincide, because they have an it inclination of 10° in relation to the centre and additionally the slots are aligned to the centre when the support is assembled.

And, the perforation number chosen is determined by the size of the arm-rest, so that if the first perforation is chosen for the assembly alignment (which is the hole closest to the centre, preferably 14 cm) the smallest size of arm-rest will be mounted and if last perforation is chosen (the furthest from the centre) the largest size of arm-rest will be mounted, so that according to the perforation chosen the arm-rest can be larger or smaller in length and therefore adaptable to multiple users regardless of their size.

As the horizontal rails support the weight of the arms, they have to be 1 cm thick n order to resist breaking under the weight.

However, considering that the support is manufactured from light materials such as plastic, aluminium, wood and must resist deformation with weight (to support the weight of the arms of the user) it is possible to define the ideal size of it in terms of length and cut off the surplus to maintain only the required size.

EXAMPLE OF THE PREFERRED MANUFACTURE

Below is described an example for manufacture of the proposed arm-rest, but it should be noted that the measurements and proportions mentioned are only illustrative.

The arm-rest in this example is made up of two vertical posts with a length of 38 cm each.

The middle part has a length of 22 cm and a diameter of 2.5 cm and the upper end a length of 8 cm, and another 8 cm at the lower end. The diameter of each of the extremities is 1.9 cm.

The first horizontal rail has a length of 69 cm and the second horizontal rail has 15% less length in relation to the first and therefore 59 cm. Both are 1 cm thick and width of 4.5 cm.

The first and second rails have a set of perforations at each end, with diameters of 1.9 cm, with a separation of 1 cm between each of them and on the second rail the first hole on each side is 10 cm from the centre whereas in the first rail it is 14 cm.

The second rail (8) has a the middle with 0.3 cm width and 3 cm long being parallel to its length.

The first rail has two identical slot with the same characteristics through which the Velcro belt, with 50 cm long and width of 2.5 cm, is inserted.

Characteristically, the assembly of the proposed arm-rest consists of:
  a) To hold the second horizontal rail to the thighs of the seated user.
  b) To determine the perforation that limits the lateral movement, according to the opening of the thighs.
  c) To insert in each of the selected holes of the second horizontal rail the lower extremities of the vertical posts, coming to rest ort the small steps that define the middle part.
  d) Insert the top ends of the vertical posts in the corresponding holes in the first horizontal rail, until they reach the small steps that define the middle part, and at this point the arm-rest is completely assembled, however it can be involuntarily dismounted, so it is recommended to complete subsection e).
  e) Slide the Velcro belt into the third slot located in the first horizontal rail (7), making sure to fold the belt to avoid it slipping.
  f) Insert the free end of the belt through one of the slots in the second horizontal rail (8) and pull it tight
  g) Insert the free end of the belt through the remaining slot in in the second horizontal rail (8), in such a way that the belt is parallel to itself and can be secured using the Velcro®, so the arm-rest is prevented from being dismounted.

Finally, the arm-rest is assembled and ready for use.

I claim:

1. An adjustable and dismountable arm-rest to maintain a precision and stability of arms while holding binoculars, photographic cameras and video cameras, comprising:
    an upper first horizontal rail presenting a series of holes in succession, each hole equidistant from the other and running through the upper first horizontal rail's thickness:
    a lower second horizontal rail running parallel to said upper first horizontal rail and presenting a series holes in succession, each equidistant from the other and corresponding to the series of holes of the upper first horizontal rail, running through the lower second horizontal rail's thickness;
    a first vertical post and a second vertical post, separated by two distances, a first top distance between the vertical posts being larger than a second lower distance between the vertical posts, so that the distance between the vertical posts is reduced in a lower part as compared to an upper part, wherein each vertical post exhibits an upper distal end which is temporarily fixed to the upper first horizontal rail and a lower distal end that is temporarily fixed to the lower second horizontal rail;
    wherein each series of holes are created with an angle of 10° of inclination to a center of the both horizontal rails where a diameter of each hole coincides with a diameter of each vertical post so that the upper and lower distal ends of each vertical post is introduced into a determined hole number on each horizontal rail and the first horizontal rail is slid on to the upper distal end of the first and second vertical posts until the first horizontal rail reaches a predetermined step demarcating an area where said upper distal ends of each vertical post stops and a vertical post body of each vertical post begins a different diameter forming the predetermined step which acts as a stop for each horizontal rail when both upper and lower horizontal rails are temporarily assembled on the upper and lower ends of said vertical posts;

a numbering designation where each vertical post connects to a hole number designation corresponding to the same hole number on each horizontal rail;

first and second slots running parallel to each other and parallel to the length of the upper first horizontal rail, where the first and second slots are centrally disposed upon the upper first horizontal rail;

a third slot running parallel to and along a length of the lower second horizontal rail such that the third slot is centrally disposed upon the lower second horizontal rail; and a belt running vertically and centrally located between the first and second horizontal rails such that the belt communicates with the first, second, and third slots and made to be drawn taut for securing of said arm-rest to permit the temporary retention of the horizontal rails and vertical posts when the arm-rest is assembled.

2. The adjustable and dismountable arm-rest in accordance with claim 1, wherein both vertical posts have, at the upper and lower distal ends of the vertical posts, a smaller diameter projection than that of the vertical post body that forms said step which acts as the stop for insertion of the smaller diameter into corresponding holes on both of the upper and lower horizontal rails, which reside at the same distance on either vertical post.

3. The adjustable and dismountable arm-rest according to claim 2, wherein the upper and lower distal ends of each vertical post, which are made to communicate with corresponding holes on the upper first and lower second horizontal rails, are approximately 3 mm smaller than the body of the vertical post creating the step acting as the stop for halting an advancement of said distal vertical post ends through said horizontal rail holes.

4. The adjustable and dismountable arm-rest according to claim 1, wherein each said vertical post has the same length, width, and diameters and exhibit lengths of 35 cm to 45 cm.

5. The adjustable and dismountable arm-rest according to claim 1, wherein a middle part of the vertical posts has a diameter of approximately 2.5 cm.

6. The adjustable and dismountable arm-rest according to claim 1, wherein the length of said vertical posts is approximately 22 cm.

7. The adjustable and dismountable arm-rest according to claim 1, wherein the upper and lower distal ends of the vertical posts are approximately 8 cm to 11 cm long.

8. The adjustable and dismountable arm-rest according to claim 1, wherein the upper first horizontal rail is longer than the lower second horizontal rail and presents a rectangular prismatic geometry where a wider top side of the rectangular prismatic geometry is arranged largely perpendicular to the vertical posts to provide more space for support of the arms and thighs of a user during use for maintaining said precision and stability of arms.

9. The adjustable and dismountable arm-rest according to claim 1, wherein the upper first horizontal rail is 10 to 20% longer in relation to the lower second horizontal rail.

10. The adjustable and dismountable arm-rest according to claim 1, wherein the upper first horizontal rail length is approximately 40 cm to 100 cm in length.

11. The adjustable and dismountable arm-rest according to claim 1, wherein the lower second horizontal rail length is approximately 30 cm to 90 cm in length.

12. The adjustable and dismountable arm-rest according to claim 1, wherein the upper first and lower second horizontal rails have respective centers aligned when the adjustable and dismountable arm-rest is assembled.

13. The adjustable and dismountable arm-rest according to claim 1, wherein the upper first horizontal rail and lower second horizontal rail have a thickness of approximately 1 cm.

14. The adjustable and dismountable arm-rest according to claim 1, wherein a first hole of each extremity of the upper first horizontal rail is approximately 14 cm in distance from the center of the upper first horizontal rail.

15. The adjustable and dismountable arm-rest according to claim 1, wherein a first hole of each extremity of the lower second horizontal rail is approximately 10 cm distant from the center of the lower second horizontal rail.

16. The adjustable and dismountable arm-rest according to claim 1, wherein the length of said slots is at least 1 cm and not greater than 5 cm.

17. The adjustable and dismountable arm-rest according to claim 1, wherein the width of each slot is at least 0.2 cm and not greater than 0.5 cm.

* * * * *

UNITED STATES PATENT AND TRADEMARK OFFICE
CERTIFICATE OF CORRECTION

PATENT NO. : 10,159,352 B2
APPLICATION NO. : 15/511845
DATED : December 25, 2018
INVENTOR(S) : Jose Angel de la Garza de la Fuente It is certified that error appears in the above-identified patent and that said Letters Patent is hereby corrected as shown below:

On the Title Page

Abstract (57) - 11th line - "by running a belt thorough centrally deposed slots in the" should be changed to "by running a belt through centrally deposed slots in the"

In the Specification

Column 1 - Line 19 - "is manufactured is such a way" should be changed to "is manufactured in such a way"

Column 2 - Line 20 - ""extremeities" should be changed to "extremities."

Column 2 - Line 28 - "lowest ext remit" should be changed to "lowest extremity"

Column 3 - Line 33 - "they have to be 1 cm thick n order" should be changed to "they have to be 1 cm thick in order"

Column 3 - Line 63 - "The second rail (8) has a the middle" should be changed to "The second rail (8) has a slot in the middle"

Column 4 - Line 9 - "coming to rest ort the small" should be changed to "coming to rest on the small"

Column 4 - Line 21 - "and pull it tight" should be changed to "and pull it tight."

Column 4 - Line 23 - "in in the second horizontal" should be changed to "in the second horizontal"

Signed and Sealed this
Thirtieth Day of July, 2019

Andrei Iancu
*Director of the United States Patent and Trademark Office*

CERTIFICATE OF CORRECTION (continued)
U.S. Pat. No. 10,159,352 B2

In the Claims

Column 5 - Lines 26-33 - Claim 3 - Please replace the entirety with the following:
The adjustable and dismountable arm-rest according to claim 1, wherein each said vertical post has the same length, width, and diameters and exhibit lengths of 35 cm to 45 cm.

Column 5 - Lines 34-39 - Claim 4 - Please replace the entirety with the following:
The adjustable and dismountable arm-rest according to claim 2, wherein the upper and lower distal ends of each vertical post, which are made to communicate with corresponding holes on the upper first and lower second horizontal rails, are approximately 3mm smaller than the body of the vertical post creating the step acting as the stop for halting an advancement of said distal vertical post ends through said horizontal rail holes.